United States Patent

[11] 3,571,636

| [72] | Inventors | Joseph T. Carle; |
| --- | --- | --- |
| | | Charles L. Choate, Tulsa, Okla. |
| [21] | Appl. No. | 882,902 |
| [22] | Filed | Dec. 8, 1969 |
| [45] | Patented | Mar. 23, 1971 |
| [73] | Assignee | Oil Dynamics, Inc., |
| | | Tulsa, Okla. |

[54] PROTECTING UNIT FOR AN OIL FIELD SUBMERSIBLE MOTOR
2 Claims, 2 Drawing Figs.

[52] U.S. Cl. .................................................. 310/87
[51] Int. Cl. .................................................. H02k 5/12
[50] Field of Search ........................................ 310/87, 86; 103/53

[56] References Cited
UNITED STATES PATENTS

| 3,369,137 | 2/1968 | Sanger .......................... | 310/87 |
| 3,384,769 | 5/1968 | Schaefer et al. ................ | 310/87 |
| 3,475,634 | 10/1969 | Boydanov et al. ............. | 310/87 |
| 3,502,919 | 3/1970 | Boyd et al. .................... | 310/87 |

Primary Examiner—D. F. Duggan
Attorney—Head & Johnson

ABSTRACT: A protecting unit interposed between an oil filled submersible electrical motor and a pump includes upper and lower chambers. The lower chamber is subdivided into a plurality of reservoirs connected in series to form a unitary passageway for oil expanding upwardly incidental to a temperature rise therein caused by actuation of the motor. The upper chamber communicates with the outermost reservoir of the lower chamber and includes a collapsible membrane disposed between and sealed to the upper and lower extremities thereof to define two pressure zones whereby changes in the volume of oil in one pressure zone results in an inverse change in the volume of well fluid in the other pressure zone.

PATENTED MAR 23 1971

3,571,636

INVENTORS.
JOSEPH T. CARLE
CHARLES L. CHOATE
BY
Head & Johnson
ATTORNEYS 3,571,636

PROTECTING UNIT FOR AN OIL FIELD SUBMERSIBLE MOTOR

BACKGROUND OF THE INVENTION

This invention relates to a protecting unit for submersible motors and more particularly relates to a protective unit for a submersible motor filled with oil as a lubricative medium and having a shaft coupled to a pump located thereabove. Submersible electrical motors employing oil as its lubricant are commonly accepted in the industry. These electrical motors are especially adapted for powering a pump located thereabove through coaxial spleening of their shafts. One of the characteristics of an oil field electrical motor is that upon rotation thereof, the oil lubricant becomes heated and expands upwardly along the shaft. Conversely as the motor is deenergized the oil contracts and flows back into the interior of the motor.

Protecting units interposed between the motor and the pump and having a shaft extension therein connecting the pump and the motor are well known in the industry. Such units however have not provided protection in the event leakage or rupture of the upper seals between the protective unit and the pump assembly. Devices such as rubber bags and bellows have been proposed as a resilient barrier between the oil and contaminating well fluids but are placed usually below the motor. In those instances where the devices are above the motor they have not provided adequate precaution against direct contamination of the motor from either leakage of the upper seals or in the event the barrier is ruptured.

It is therefore the object of this invention to present a protecting unit constructed so that any well fluid ingressing into the oil passageway upon leakage or rupture of the upper seals or the collapsible element thereof is captured and prohibited from directly entering into the interior of the electric motor.

SUMMARY OF THE INVENTION

Generally the protecting unit comprises an elongated cylindrical housing having an extension shaft coaxially projecting therethrough to connect the shaft of the motor to the shaft of the pump. Interiorly of the housing there are vertically separated upper and lower chambers. Between the two chambers is a shaft seal one side of which is exposed to the well fluids. The lower chamber contains therewithin a plurality of sleeve members to form closed coaxial reservoirs serially linked and communicating with the interior of the motor to provide a unitary continuous oil passageway for the lubricating oil expanding upwardly during rotation of the motor shaft. The upper chamber includes a collapsible membrane sealed to the upper and lower extremities thereof to provide an inner and outer pressure zone. The inner pressure zone is in communication with the outermost reservoir of the lower chamber and receives oil therefrom. The outer pressure zone is in communication with the ambient well fluid surrounding the pump. Thus change in the volume of oil in the inner pressure zone results in an inverse change of an equal volume of well fluid in the outer pressure zone.

DESCRIPTION OF THE PREFERRED EMBODIMENT

Figure 1:
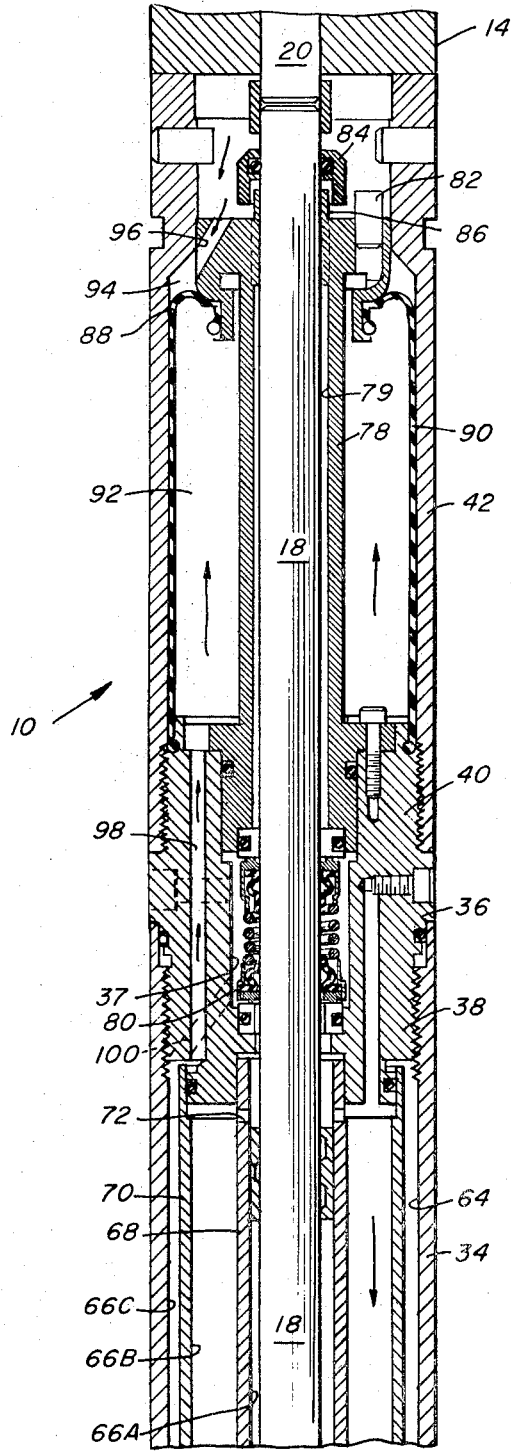
FIG. 1 is a cross-sectional view of the upper portion of the protective unit.
Figure 1A:
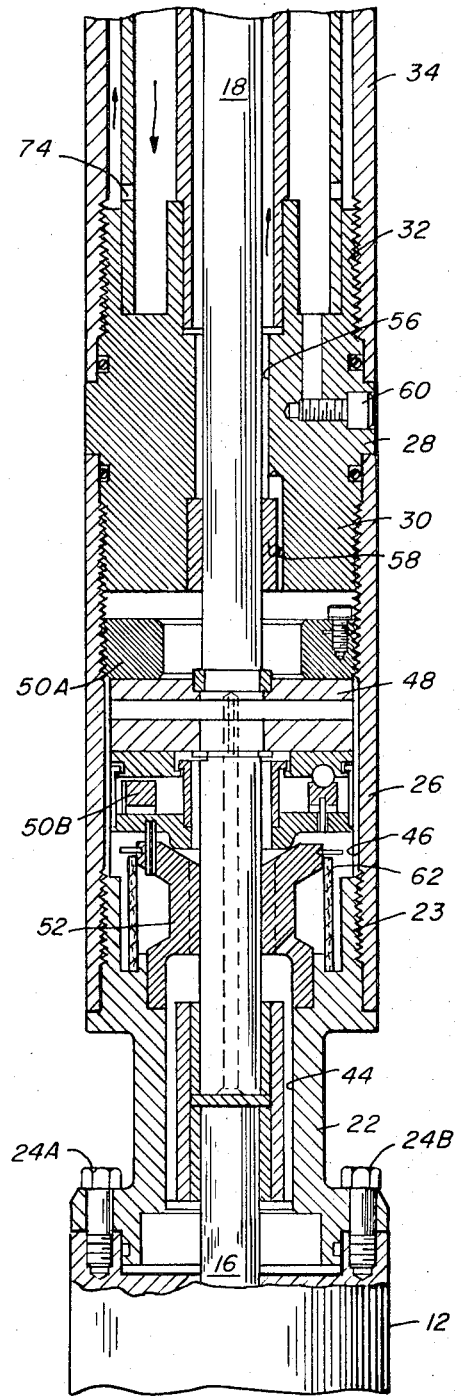
FIG. 1A is a cross-sectional view of the lower portion of the protective unit.

Referring now to the drawings, the numeral 10 generally represents the protecting unit which is interposed between a coaxial submersible electrical motor 12, employing an oil surrounding the shaft 16 thereof as the lubricating medium and a pump 14 thereabove and having ambient well fluid surrounding the shaft 20 thereof. The vertical shaft 16 of the motor has its upper end coupled to the lower end of an extension shaft 18 which passes coaxially through the protective unit 10. The upper end of the extension shaft 18 is coupled to the lower end of the pump shaft 20 thereby interconnecting the shafts for common rotation. Any suitable coupling means may be employed on the respective shafts.

The protective unit 10 is an elongated cylindrical housing assembled from vertically spaced interconnected members which coaxially surround extension shaft 18.

Looking now at the lower end of the protective unit 10, the base member 22 suitably joined at the lower end thereof to the motor housing by bolts 24A and 24B incorporates on the upper end thereof an integral annular upstanding threaded flange 23.

An annular elongated lower housing member 26 possesses on the lower end thereof female threads which threadably engage the male threads on flange 23 and at the upper end thereof possesses additional female threads.

A partition member 28 includes on the lower end thereof a downwardly projecting annular flange 30 which engages the female threads on the upper end of the lower housing member 26 and at the upper end thereof includes an upwardly projecting flange 32 having thereon male threads which are engaged by complementary female threads on the lower end of an intermediate housing member 34 which also contains on the upper end thereof female threads. First partition member 28 has therethrough a central elongated aperture 56 through which extension shaft 18 passes.

Similar to the first partition member 28 a second partition member 36 includes on the upper end thereof a downwardly projecting annular flange 38 having thereon male threads which engage the female threads on the upper end of the intermediate housing member 34 and includes at the upper end thereof an upwardly projecting tapered flange 40 having male threads which are engaged by complementary female threads on the lower end of an upper housing member 42 which is suitably joined at the upper end thereof to the casing of pump 14. Second partition member 36 also incorporates an elongated central aperture 37 for passage of the extension shaft 18 therethrough.

Turning now to the interior configuration of the protecting unit 10 and the components therein, the base 22 has a cavity 44 in communication with the interior of the motor 12 and in which the aforesaid coupling of the motor shaft 16 and extension shaft 18 is accomplished.

Upward of the base, the lower housing member 26 has a hollow interior which is in communication with the cavity 44 and which contains an oil filter and various roll snap rings as is commonly found in protective units for submersible pumps. Interiorly of the lower housing member 26, extension shaft 18 carries an outwardly extending thrust bearing assembly 48 which is interposed within a pair of annular thrust bearing members 50A and 50B secured to the casing of the lower housing member. Downwardly of the thrust bearing assembly there is located a bushing 52 surrounding the shaft for properly aligning and facilitating rotation thereof.

As can be seen in the drawings the motor lubricating oil upon expanding upwardly incidental to the energization of the motor has access into the lower housing member 26 via the base 20 to surround and lubricate the various components located therein.

Moving upwardly into the interior of the first partition 28, an annular elongated spacing between central aperture 56 therein and extension shaft 18 forms an oil route through the partition member, the utility of which will subsequently become apparent. A straight bearing assembly 58 may be secured around the shaft such as shown at the lower end of aperture 56. Transversing inwardly from the outer wall of the first partition 28 is a drain plug 60.

Looking now at the intermediate housing member 34, it can be seen that within the interior thereof there is an annular cylindrical lower chamber 64 which is bounded on the inner periphery thereof by extension shaft 18 and on the outer periphery thereof by the casing of the intermediate housing member 34 and which is enclosed at the lower end by first partition 28 and at the upper end by second partition 36.

Lower chamber 64 is subdivided into concentric cylindrical inwardly-outwardly progressing reservoirs 66A, 66B, and 66C by means of sleeves 68 and 70 laterally spaced and coaxially surrounding extension shaft 18. The sleeves have their upper and lower end terminating at and snugly fitted against the first and second partition members. Reservoir 66A, 66B and 66C are connected in series to form a unitary continuous lubricating oil passageway; that is, reservoir 66A communicates with 66B through a transverse upper annular port 72 in the upper end of sleeve 68 and reservoir 66B communicates with reservoir 66C through a lower annular port 74 located at the lower end of sleeve 70.

The lower end of reservoir 66A also communicates with the interior of the lower housing member 26 through central aperture 56 and is sealed at the upper end by the lower seal of a double seal ring 80 embracing shaft 18 within aperture 37. Reservoir 66B is fluidly interconnected to drain plug 60 through a borehole 76 in first partition member 28.

Turning attention now to the interior of the upper housing member 42, running the length thereof and concentrically received over and laterally spaced from the extension shaft 18 is an elongated breather tube 78 having its lower end firmly fitted within central aperture 37. The spacing between the extension shaft 18 and the inner walls of breather tube 78 forms a well fluid passageway 79 sealed at the lower end by the upper seal of double seal of double seal ring 80. The upper end of the breathing tube 78 is flanged outwardly to become firmly fitted against the inner wall of the upper housing member 42. Wedged between the extension shaft and the upper end of the breather tube 78 is a straight bearing assembly 86 for properly aligning the shaft and for facilitating rotation thereof.

The outer wall of the breather tube 78 and the inner wall of the upper housing member 42 define an upper chamber 88 closed at the lower extremity by second partition 34 and at the upper extremity by the flange portion of breather tube 78. Disposed within the upper chamber 88 is an annular cylindrical collapsible membrane 90 suitably sealed at the upper end to the flange portion of the breather tube and at the lower end to the second partition 36 thereby dividing the upper chamber into an inner 92 and outer 94 pressure zone. A borehole 96 through the flange portion of the breather tube provides an access route enabling the well fluid surrounding the pump shaft 20 to enter or leave outer pressure zone 94. In a similar manner the motor lubricating oil can enter or leave the pressure zone 92 through a longitudinal borehole 98 in partition 54 which fluidly links the inner pressure zone 92 with reservoir 66C. A check valve 82 disposed in the flange portion of tube 78 provides safety relief for inner pressure zone 92.

An inclined transverse borehole 100 between aperture 37 and reservoir 66C as shown by the dash lines in FIG. 1 provides an escape route for well fluid contained in passageway 79 in the event the upper seal of the double seal assembly 80 should rupture.

Embracing extension shaft 18 directly above the upper end of the breather tube 78 and sealed thereto by a compliant O-ring is a sand cap 84 having thereon an annularly vertically downwardly extending flange which projects over and outwardly of the upper end of bearing assembly 86 to form a shield which prevents entrance of sand and other foreign material into well fluid passageway 79, but allows entrance of well fluid thereinto.

When the protective unit is interposed between the motor 12 and the pump 14 and is properly installed for operation, the well fluid surrounding the pump 14 enters the protective unit upwardly of the breather tube 78 through borehole 96 and passes into outer pressure zone 94 of the upper chamber 88. The well fluid also flows longitudinally downwardly into well fluid passageway 79 where double seal 80 prevents escapage of well fluid therefrom.

When the electrical motor is actuated and the shaft rotates, the lubricating oil expanding upwardly incidental to a rise in temperature thereof, expands into the interior of the base 22 then into the lower housing 26 and into inner reservoir 66A through the aperture 56 in first partition 28.

Continual expansion of the oil forces the same up reservoir 66A and through port 72 whereupon it flows downwardly within reservoir 66B and through port 74. The oil then rises upwardly within reservoir 66C through borehole 98 and into the inner pressure zone 92. Pressure exerted on the collapsible membrane by the influx of oil causes expelling of the well fluid out of the oil pressure zone 94 through borehole 96.

When the motor is deenergized, the lubricating oil will contract back into the interior of the motor and resultantly the well fluid will be drawn back into the pressure zone 94.

If the collapsible membrane should become ruptured and the well fluid allowed to enter into the inner pressure zone 92, it will flow through the borehole 98 into the reservoir 66C and thence into 66B where since it has a relative density greater than that of oil, the well fluid would settle in the lower end of the reservoir 66 and be drained by the utilization of drain plug 60.

Likewise if the upper seal of the double seal 80 surrounding the extension shaft 18 at the lower end of the breather tube 78 should deteriorate and allow leakage of the well fluid, the well fluid would flow through borehole 100 into the outer reservoir 66C and become settled in the lower end of reservoir 66B where it too could easily be removed to the utilization of drain plug 60. Even if the well fluid is not immediately removed, such will not rise upwardly in reservoir 66B since as before mentioned, it has a relative density greater than that of the oil.

Thus the protective unit provides a means of containing the expanding lubricating oil and also for the removal and also provides a positive means for capturing and removing of well fluid received within the protective unit before the well fluid can enter into the interior of the motor and consequently do harm thereto.

During the detailed description of the preferred embodiments specific terminology has been used for the sake of clarity. However, it is to be understood that the words used are not meant as words of limitation and include all equivalent words which operate in a similar manner which accomplish a similar purpose.

We claim:

1. A protective device for a submersible electrical motor adapted to drive a pump located above and of the type utilizing a lubricating oil about the shaft thereof comprising:

a hollow housing interposed between and connected to the casings of said pump and said electrical motor;

a shaft extension projecting coaxially through said housing to couple the shaft of said motor to the shaft of said pump;

means for dividing said housing into vertically spaced coaxial cylindrical closed upper and lower chambers; said chambers being confined between said extension shafts and the inner wall of said housing;

a plurality of cylindrical laterally spaced sleeves concentrically disposed within said lower chamber and sealed to the extremities thereof to provide annular concentric oil reservoirs therewithin, the innermost reservoir being in communication with the interior of said motor; said reservoirs being serially communicative to provide a unitary continuous oil passageway of a length multiple about that of said lower chamber;

a flexible cylindrical membrane coaxially received in said upper chamber and sealed at the upper and lower extremities thereof to provide inner and outer pressure zones within said upper chamber; said outer pressure zone communicating with the well fluid surrounding said pump shaft and said inner zone communicating with said outermost oil reservoir in said lower chamber whereby undulation in the volume of oil received in said inner zone incidental to the expansion thereof during energization of said motor is transmitted to the outer pressure zone through said flexible membrane to cause an inverse undulation of an equal volume of well fluid in said outer pressure zone.

2. A protecting unit as in claim 1 including a drainage means at the lower end of one of said reservoirs whereby well fluid entering into said oil passageway upon rupture of said collapsible membrane can be removed.